(12) United States Patent
Carlson et al.

(10) Patent No.: US 6,611,185 B2
(45) Date of Patent: Aug. 26, 2003

(54) MAGNETORHEOLOGICAL FLUID BASED JOINT

(75) Inventors: J. David Carlson, Cary, NC (US); Mitzi R. Vernon, Christiansburg, VA (US); Lynn C. Yanyo, Cary, NC (US)

(73) Assignee: Lord Corporation, Cary, NC (US)

( * ) Notice: Subject to any disclaimer, the term of this patent is extended or adjusted under 35 U.S.C. 154(b) by 161 days.

(21) Appl. No.: 09/883,024

(22) Filed: Jun. 15, 2001

(65) Prior Publication Data

US 2002/0036127 A1 Mar. 28, 2002

Related U.S. Application Data

(60) Provisional application No. 60/211,722, filed on Jun. 15, 2000.

(51) Int. Cl.[7] ................................................ H01H 9/00
(52) U.S. Cl. ................... 335/207; 335/285; 403/DIG. 1
(58) Field of Search ................................ 335/205–207, 335/285; 403/273–285, DIG. 1

(56) References Cited

U.S. PATENT DOCUMENTS

| 3,222,771 A | * | 12/1965 | Schwinghamer | ............ 403/273 |
| 3,951,560 A | | 4/1976 | Beer | |
| 5,375,049 A | | 12/1994 | Witt | |
| 5,887,917 A | * | 3/1999 | Luciana | ...................... 335/285 |

FOREIGN PATENT DOCUMENTS

| DE | 89 05 524 | 5/1989 |
| WO | WO 00/11351 | 3/2000 |

* cited by examiner

Primary Examiner—Tuyen T. Nguyen
(74) Attorney, Agent, or Firm—Michael M. Gnibus; Edward F. Murphy, III (57) ABSTRACT

A joint member for selectively joining first and second members, said joint member comprising a first coupling member comprising a volume of field responsive material and a second coupling member comprising a field generating member for selectively applying a field across the field responsive material, the joint member also comprising means for selectively moving the field responsive material toward and away from the field generating means.

37 Claims, 10 Drawing Sheets

MAGNETORHEOLOGICAL FLUID BASED JOINT

This application claims the benefit of Provisional Application serial No. 60/211,722 filed Jun. 15, 2000.

FIELD OF THE INVENTION

The invention generally relates to magnetorheological (MR) fluid devices, and more specifically the invention relates to a magnetorheological fluid based joint for selectively and releasable joining at least two discrete members in fixed abutment.

BACKGROUND OF THE INVENTION

Generally, magnetorheological fluid devices include a volume of MR fluid, comprised of a fluid medium having magnetizable particles suspended in a viscous liquid carrier such as oil. When a magnet is applied to the MR fluid, the particles are magnetized and as a result are held in place by the applied magnetic field. The magnetizable fluid assumes a near-solid state when the magnetic field is applied. When the magnet is removed from its position proximate the MR fluid, the MR fluid returns to its viscous liquid state.

MR fluid devices are typically comprised of rotary and linear acting dampers. The rotary devices are frequently used as brakes, clutches and the like for providing variable torques while linear acting devices are frequently used for damping linear motion or for providing controllable dissipative forces along a specified axis. In such typical applications of the MR fluid based technology, a magnetic field is applied across the MR fluid in order for the device to provide the requisite resistance to motion or displacement and thereby supply the requisite braking or damping. The required magnetic field is determined by one or more operating variables of the device such as the speed of a device component. Thus the magnetic field required to produce the desired braking or damping is applied across the medium for the required period of time and at the required intensity.

By using MR fluid in such mechanical devices, a significant portion of the devices' mechanical componentry having an associated finite life may be replaced by the MR devices having a useful life that is typically significantly greater than the replaced mechanical components.

In addition to the foregoing, it would be beneficial to use the field responsive material joint for connecting discrete members. By incorporating a volume of field responsive material in a joint, mechanical fasteners and other components may be eliminated and discrete members may be connected and disconnected easily and reliably.

The foregoing illustrates limitations known to exist in present MR devices and methods. Thus it is apparent that it would be advantageous to provide an alternative directed to overcoming one or more of the limitations set forth above. Accordingly, a suitable alternative is provided including features more fully described hereinafter.

SUMMARY OF THE INVENTION

In one aspect of the invention this is accomplished by providing a temporary joint comprising a first discrete member having a first movable coupling member and a second discrete member having a second movable coupling member. The first coupling member comprises a closed housing defining a chamber, a volume of a field responsive material such as magnetorheological (MR) fluid in a portion of the chamber, a material transfer member in the chamber and means for moving the transfer member to thereby move the material to the desired location in the chamber. The second coupling member comprises a field generating member such as a magnet. When it is necessary to couple the discrete members, the field responsive material is moved to the position in the chamber proximate the field generating means. As the field generating means is located proximate the material the discrete members are coupled. In order to uncouple the members, the transfer member is actuated to move the field responsive material away from the field generating member. Alternatively, the field generating member may first be removed from its location proximate the field responsive material.

The second coupling member may be comprised of a arcuate magnet, a solid pole piece, a slotted pole piece or a magnet supported by a holder.

In the first coupling member the transfer member may comprise a wedge shape or a bow tie shape and may be moved by a lever, a knob or by the second coupling member. By the joint of the present invention, the discrete members may be coupled in the same plane or may be separated by an angle.

The foregoing and other aspects of the invention will become apparent from the following detailed description of the invention when considered in conjunction with the accompanying drawing figures.

DETAILED DESCRIPTION OF THE PREFERRED EMBODIMENTS

Figure 1:
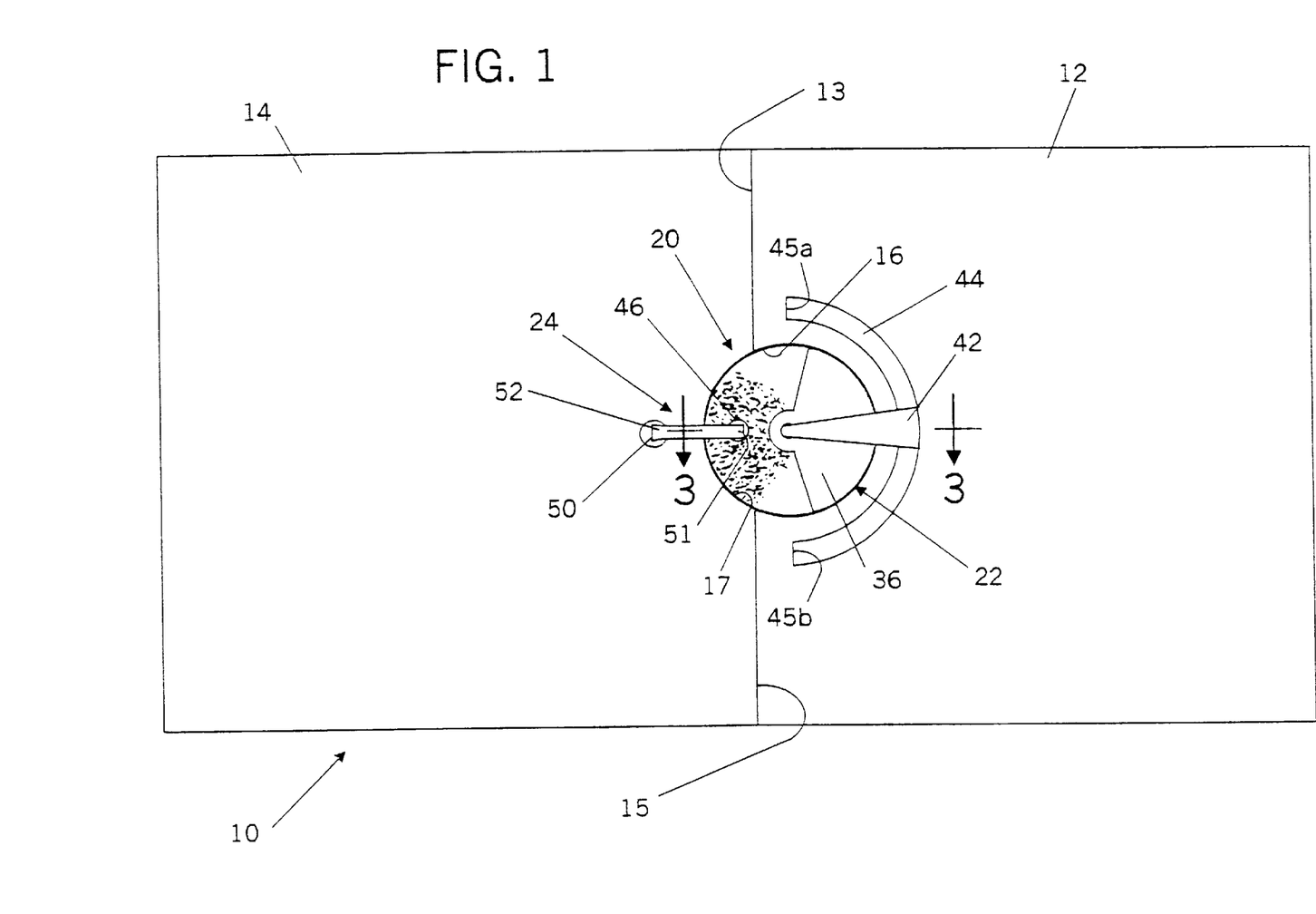
FIG. 1 is a top plan view of first and second members coupled by a first embodiment of the joint of the present invention so that both the first and second members are in the same plane.

A first embodiment joint 20 is illustrated in FIGS. 1–5. Now turning to the drawing Figures wherein like members are referred to by the same reference numbers in the several views, member assembly 10 in FIG. 1 shows first discrete member 12 and second discrete member 14 removably coupled by first embodiment joint 20. The first and second members 12 and 14 may be pages in a book or discrete boards or panels that when made integral by joint 20 produce a complete figure, scene, diagram, shape or pattern for example.

The first member 12 is substantially planar and comprises an abutment face or abutment surface 13 with arcuate recess 16 provided along the face 13 and extending into a portion of the member 12. The recess does not extend completely through member 12. The second member 14 is also substantially planar and comprises an abutment face or abutment surface 15 with arcuate recess 17 provided along the surface 15 and extending into, but not through, the second member. When the surfaces 13 and 15 are moved into abutment as shown in FIG. 1, a substantially circular recess is produced by the combined recesses 16 and 17.

Figure 2:
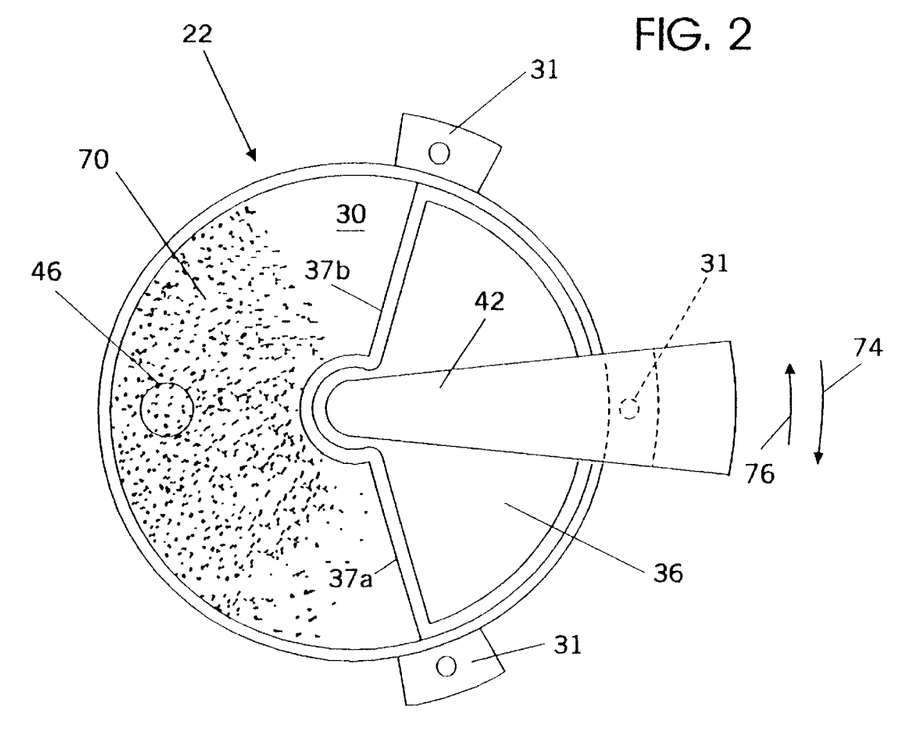
FIG. 2 is an enlarged view of the first coupling member of the first embodiment joint of FIG. 1.
Figure 3:
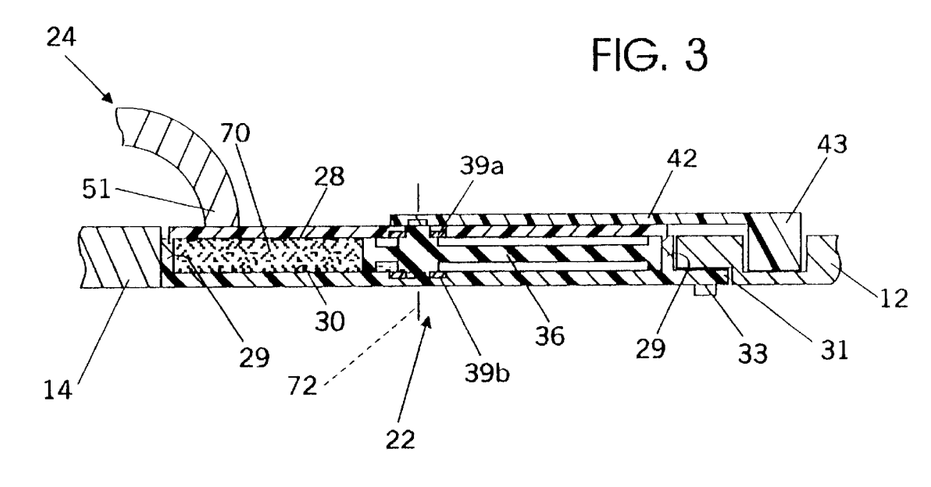
FIG. 3 is a sectional view taken along line 3—3 of FIG. 1.

The first embodiment joint 20 is comprised of first coupling member 22 and second coupling member 24. As shown in FIG. 1, portions of the first coupling member 22 are seated in the recesses 16 and 17. As shown in FIGS. 2 and 3, the first coupling member 22 includes cylindrical housing 26 having a closed bottom portion and an open top portion that is closed by substantially flat cover 28 seated on housing wall 29. Together, the housing 26 and plate 28 define chamber 30. The housing 26 and plate 28 are made from a non-magnetic material such as plastic for example. The housing is unitary and includes a plurality of attachment tabs 31 that are spaced around a portion of the exterior of wall 29. As shown in FIG. 2, the first coupling member includes three tabs however any number of tabs may be provided. The tabs are located along the portion of wall 29 that is adapted to be located in recess 16. The first coupling member is made integral with first member 12 by conventional fasteners such as pins, tacks, screws or the like 33 that are passed through openings in the tabs to attach the first coupling member 22 to the member 12. An indicia 46 is provided on the plate 28 and serves as a means for locating one end of the second coupling member 24 on the plate as shown in FIGS. 1 and 2. As shown in FIG. 2, the indicia is a circle however the indicia may comprise any suitable mark.

A volume of a field responsive material 70 such as a magnetorheological (MR) fluid, which may be in the form of a liquid or powder, occupies a portion of the volume of chamber 30. The suitable field responsive material is any non-solid material that changes from a non-solid state to a near solid state by the application of a field generating means across the material 70. In the preferred embodiments of the present invention, the rheology of material 70 changes from the liquid or powder form to a near solid mass when the magnetic field is applied across the material 70 by second coupling member 24. The field responsive material is represented by the stippling in FIGS. 1, 2 and 3. The joint between members 12 and 14 is formed when the material assumes the near solid state. The joint may be broken by applying a significant force to move the transfer member 36 and displace the material to a position away from the field generating means. Thus, the field responsive material may be displaced through the chamber toward and away from positions proximate the second coupling member 24 to thereby respectively lock and unlock joint 20.

The field responsive material is displaced through the chamber by a movable, wedge-shaped transfer member 36 located in chamber 30. The transfer member is made from a nonmagnetic material such as polypropylene and includes leading faces 37a and 37b that move the material 70 to the desired location in chamber 30 as the transfer member 36 is rotated about axis 72 in respective clockwise and counter-clockwise directions 74 and 76 by a lever 42 that is directly connected to the transfer member 36. Lever 42 includes a downturned tail portion 43 along the outer periphery of the lever that is seated in arcuate slot 44 provided on first member 12 adjacent recess 16. The slot extends about 180° and terminates at closed ends 45a and 45b. See FIG. 1. The slot serves to guide and limit the displacement of lever 42 and ultimately member 36. As shown in FIGS. 1 and 2, the transfer member occupies approximately half of the chamber volume.

A pair of like glands or gaskets 39a and 39b are seated in grooves provided in the cover 28 and housing bottom 26 respectively and the respective gaskets serve to form the required seal between the lid, and transfer member 36 and between the member 36 and housing 26 to prevent the material 70 from displacing from the designated portion of the chamber 30 and relocating on the transfer member 36.

The first embodiment joint 20 comprises second coupling member 24 that is comprised of a conventional magnet member that has an arcuate configuration. The member 24 has a first end 51 that is adapted to be located at indicia 46 in first coupling member 22 and a second end 52 that is adapted to be seated on metal disk 50 that is seated in a recess 53 provided in second member 14. The steel member 50 provides a means for anchoring or holding the magnet in place during use. The arcuate member may have an arc spanning any suitable number of degrees. For example, as shown in FIG. 5, the arc magnet may comprise an arc approximately equal to ninety degrees, and in FIG. 4, the arcuate magnet 24 comprises an arc that is less than ninety degrees.

Figure 4:
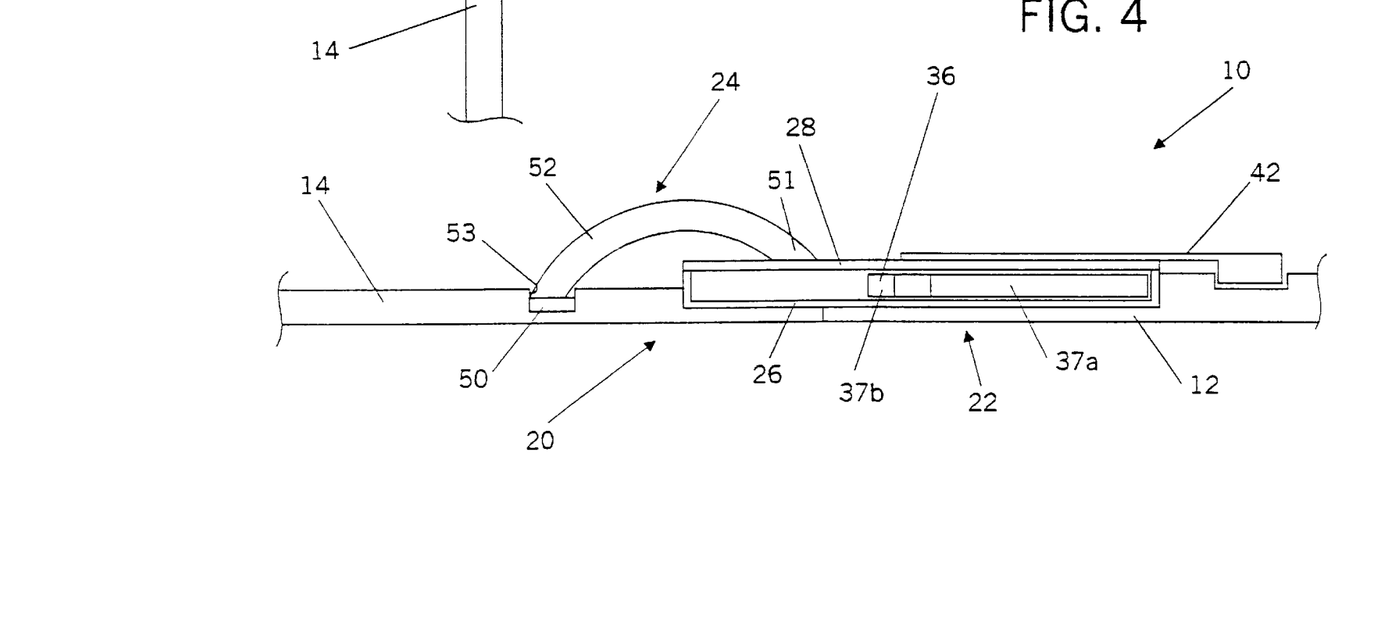
FIG. 4 is a schematic front elevational view of the first and second members of FIG. 1 coupled by the first embodiment joint.

Turning to FIGS. 1 and 4, in order to establish joint 20 and thereby couple members 12 and 14 so that the members are coplanar, the housing is located in recesses 16 and 17, and tail 43 is located in slot 44. Faces 13 and 15 are moved into abutment. The handle 42 is then moved in the direction required for the transfer member to move the field responsive material proximate indicia 46. The magnet ends 51 and 52 are respectively seated on the indicia 46 and metal member 50 and 52. As a result of the magnetic field associated with magnet 24, the rheological properties of the field responsive material 70 are altered and the MR fluid assumes an near solid state, thereby producing the desired joint and coupling members 12 and 14. When it is necessary to separate members 12 and 14 a substantial breaking force is applied to the transfer member to move the material away from the second coupling member. The material 70 returns to its fluid form and the joint is broken. Alternatively the joint may be broken by lifting magnet end 51 off of the indicia 46 and then moving lever 42 as required to displace the transfer member 36 and in turn relocate the MR fluid to another location in the chamber 30 away from indicia 46.

Figure 5:
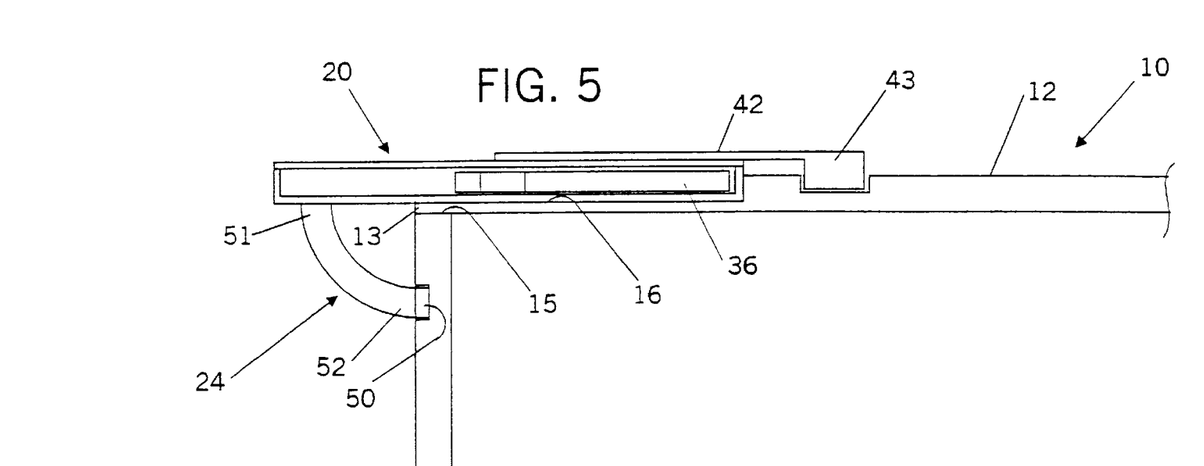
FIG. 5 is a schematic front elevational view of the first and second members of FIG. 1 showing the members coupled at a relative angle.

When it is desirable to couple members 12 and 14 at a relative angle such as at the ninety degree relative angle as shown in FIG. 5, surface 15 is located against the bottom surface of member 12. The first coupling member 22 is seated in recess 16 and the portion of housing 26 that would be located in recess 17 in the coplanar configuration previously described extends outwardly and freely from the member 12. With the field responsive material located proximate indicia 46 by transfer member 36 in the manner previously described, ends 51 and 52 of magnet 24 are then located at the housing 26 and metal member 50 to thereby form the rigid joint and thereby couple members 12 and 14. The members may be uncoupled in the manner previously described.

Figure 6:
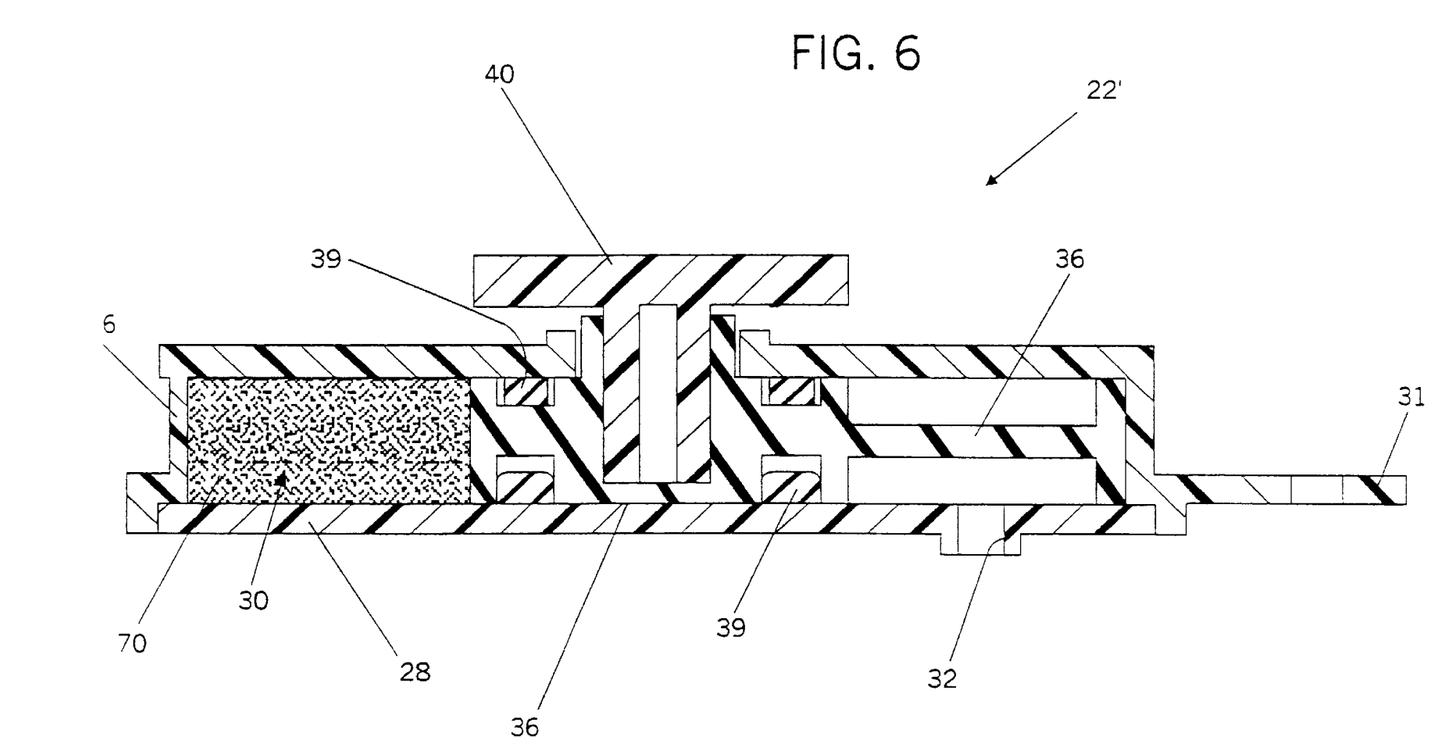
FIG. 6 is a sectional view of a first coupling member of a second embodiment joint of the present invention.

A first coupling member 22' of a second embodiment joint is illustrated in FIG. 6. The second coupling member 24 previously described may be used in combination with first coupling member 22' to form the second embodiment joint. The coupling member 22' comprises housing 26, transfer member 36 and plate as previously described. The plate and housing define chamber 30 and a volume of field responsive material is located in the chamber. In member 22' the plate is located along the bottom of coupling member. A knob 40 is connected to the transfer member 36 and serves as a means for easily moving the transfer member through the chamber 30 in the chamber. Port 32 is provided in plate 28 and facilitates filling the chamber with field responsive material and draining the material from the chamber 30. The second embodiment joint of the present invention functions in the same manner as previously described in the first embodiment joint 20 and therefore further description of the second embodiment joint is not required.

Figure 7:
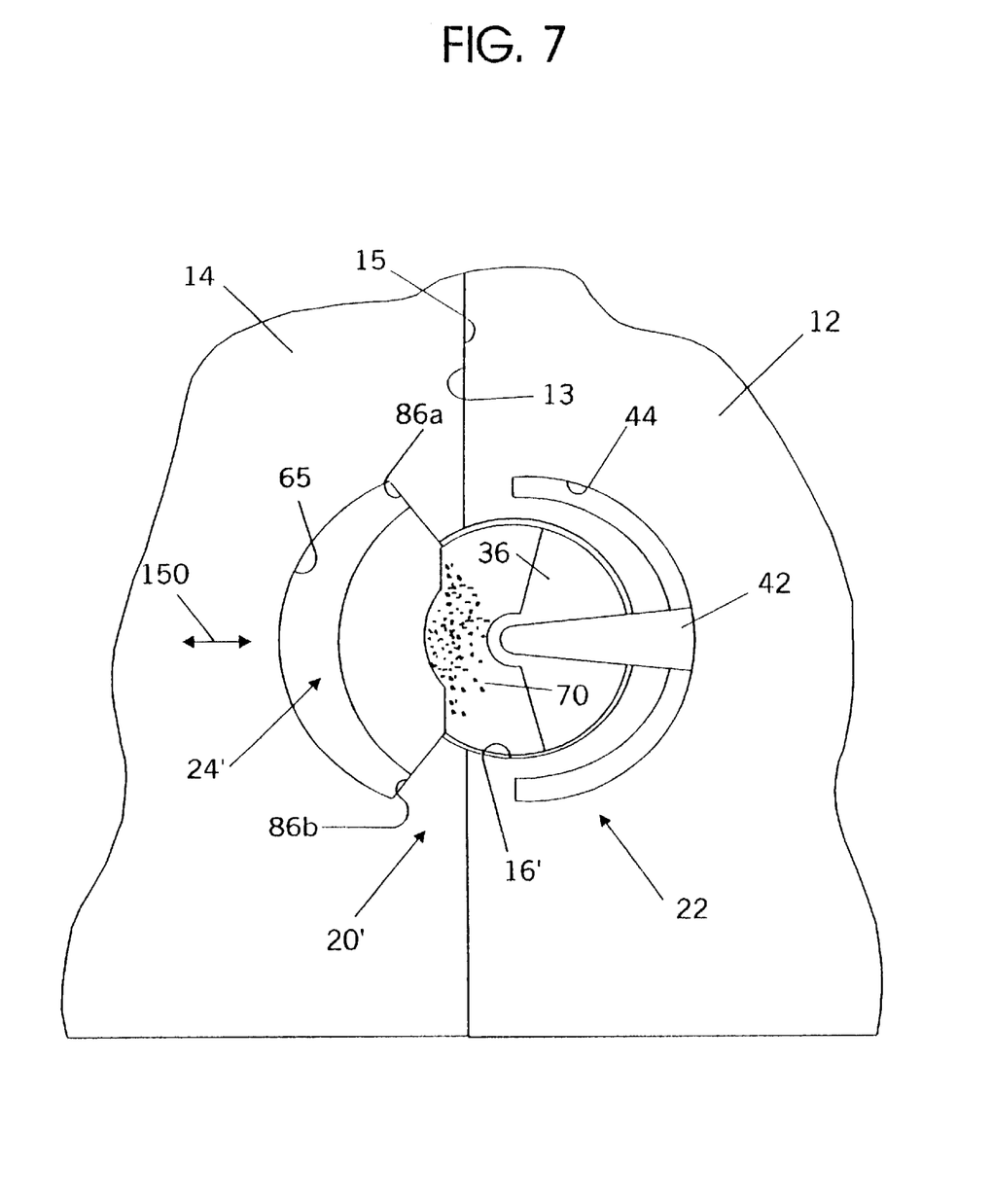
FIG. 7 is a top plan view of a third embodiment joint of the present invention.
Figure 8:
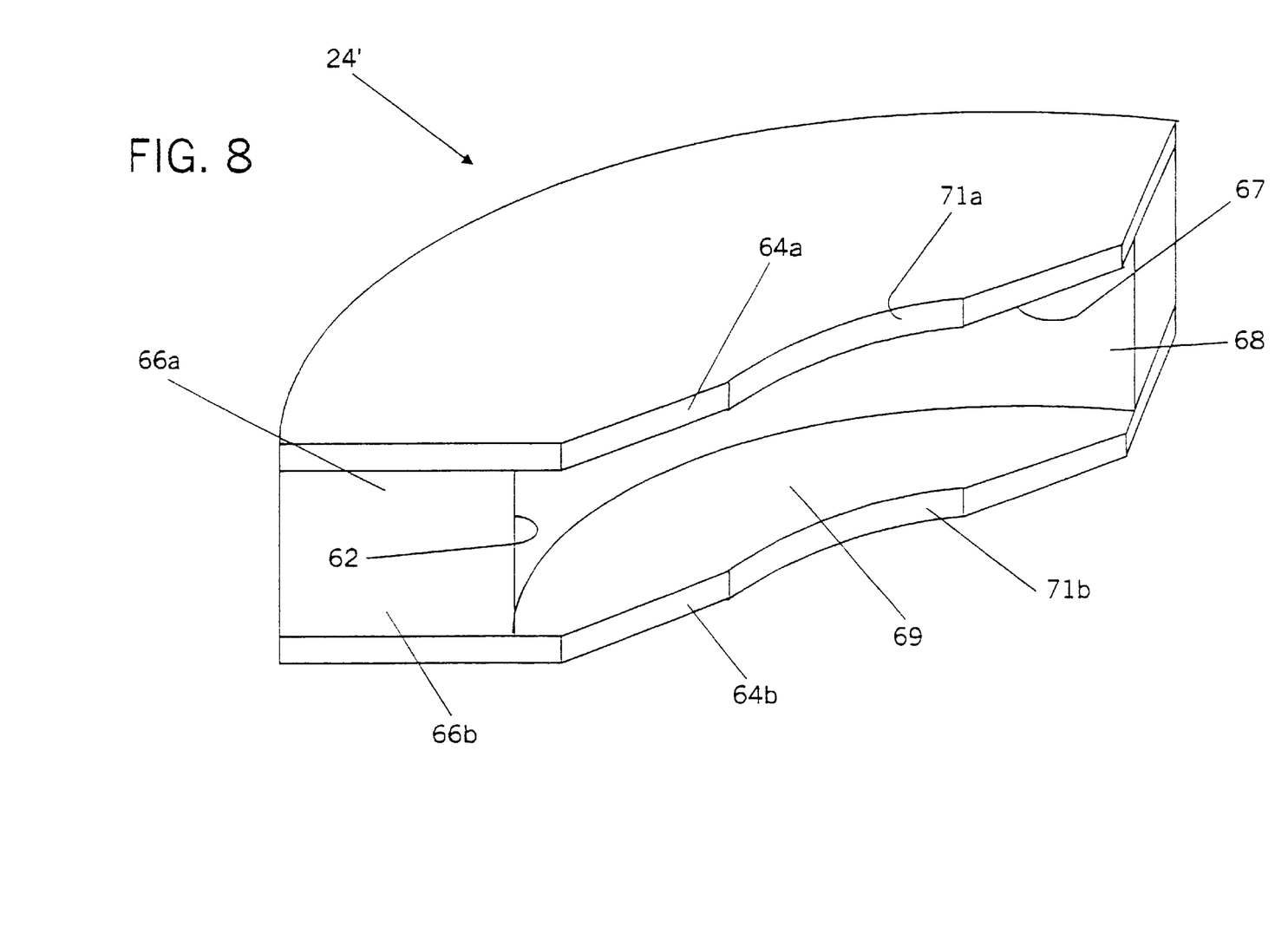
FIG. 8 is an isometric view of the second coupling member of the third embodiment joint shown in FIG. 7.

Third embodiment joint 20' of the present invention is illustrated in FIGS. 7 and 8. The joint 20' includes the first coupling member 22 as previously described hereinabove and also includes second coupling member 24' that is comprised of a slotted magnetized pole piece having a slotted recess 62 adapted to receive the portion of housing 26 and cover 28 lid that extends beyond the face 13 of first member 12. See FIG. 6. The pole piece is adapted to be located in recess 65 provided in second member 14. Recess 65 does not extend completely through the second member 14. The magnet 24' is movable linearly toward and away from coupling member 22 in the recess 65. See arrow 150.

The poles 66a and 66b of the magnetic member 24' provide a magnetic field in a manner well known to one skilled in the art. The edges 64a and 64b of the pole piece are magnetized as well as the inside top and bottom surfaces 67, 68 and 69. The coupling member is fixed to the second member 14 by conventional means. Gripping recesses 71a and 71b are provided in the upper and lower portions of magnet 24' and assist the user to grip the magnet and move the piece 24' toward and away from coupling member 22.

Operation of third embodiment joint 20' will now be described. The coupling member 22 operates in the manner previously described. After the material 70 is located proximate the magnet 24' and faces 13 and 15 are in abutment, the magnet 24' is located in recess 65 and is slid towards housing 26 until the housing 26 is located in slot 62 and between surfaces 67 and 69. The rheology of the material 70 is changed by the magnetic field and material 70 becomes a near solid. To uncouple the members, the magnet 24' is slid away from the housing.

Although the members 12 and 14 are shown as being coupled in a coplanar orientation it should be understood that the third embodiment joint 20' may also be used to couple members 12 and 14 at a relative angle. In order to couple the members at an angle, the slot 62 of magnet 24' is removed and magnet 24' is made solid. The other components of joint 20' are unchanged. After orienting members at the desired relative angle such as 90° and butting face 15 against member 12 the solid, magnetized member is located in recess 65 and is moved toward and away from first coupling member in the manner previously described to form the desired joint.

Figure 9:
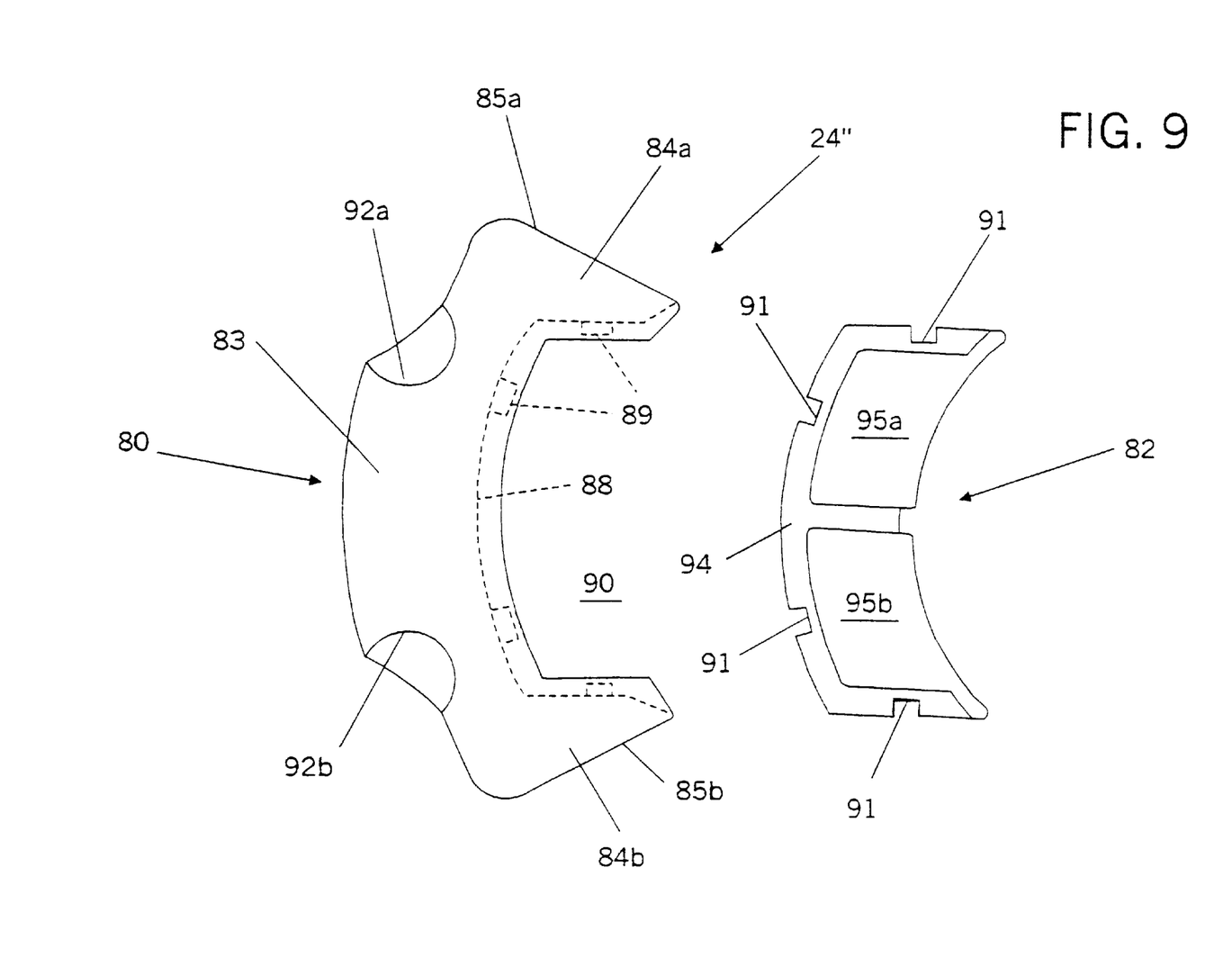
FIG. 9 is a top view of the second coupling member of a fourth embodiment joint of the present invention.
Figure 10:
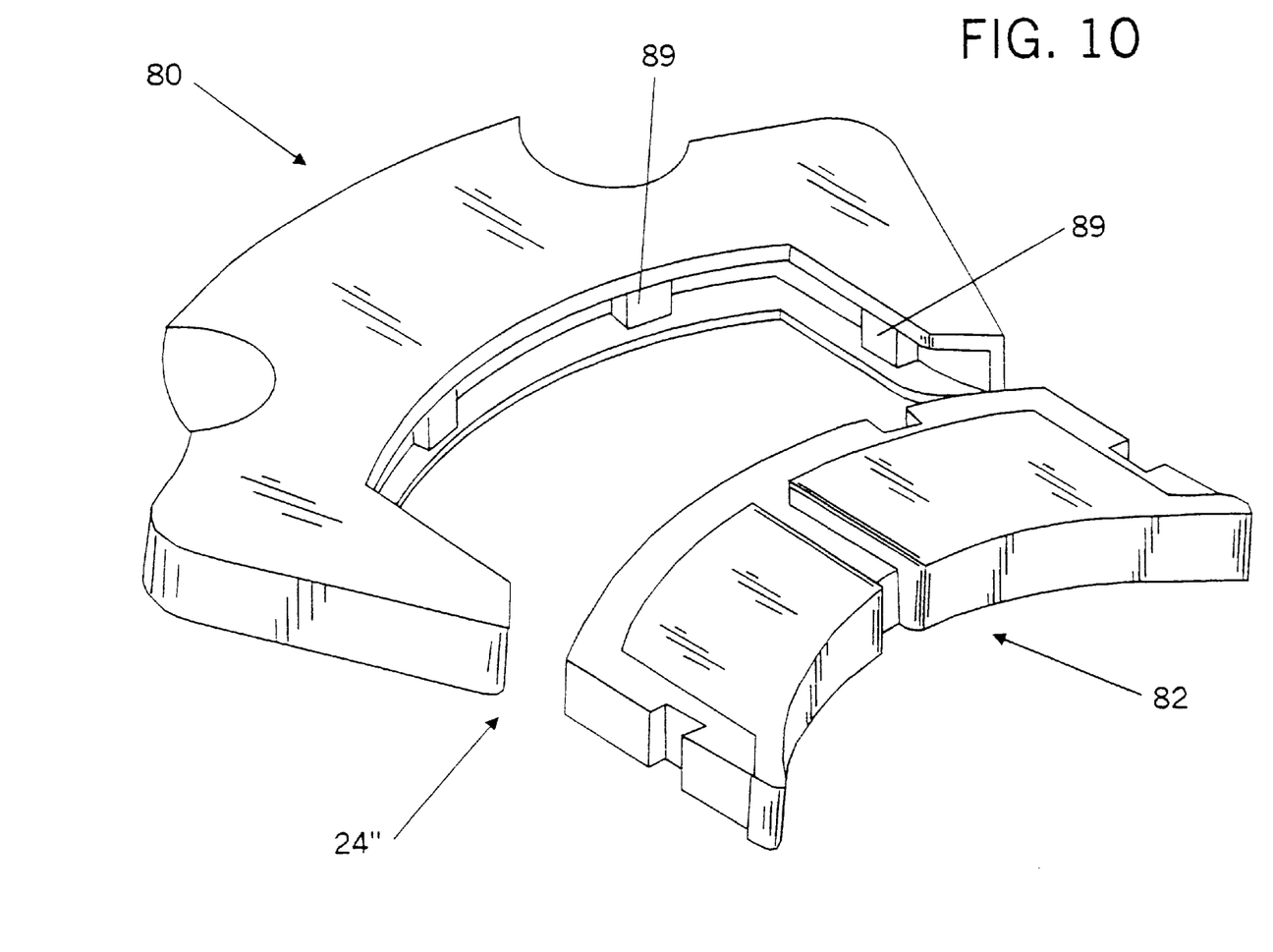
FIG. 10 is an isometric view of the fourth embodiment joint of FIG. 9.
Figure 11:
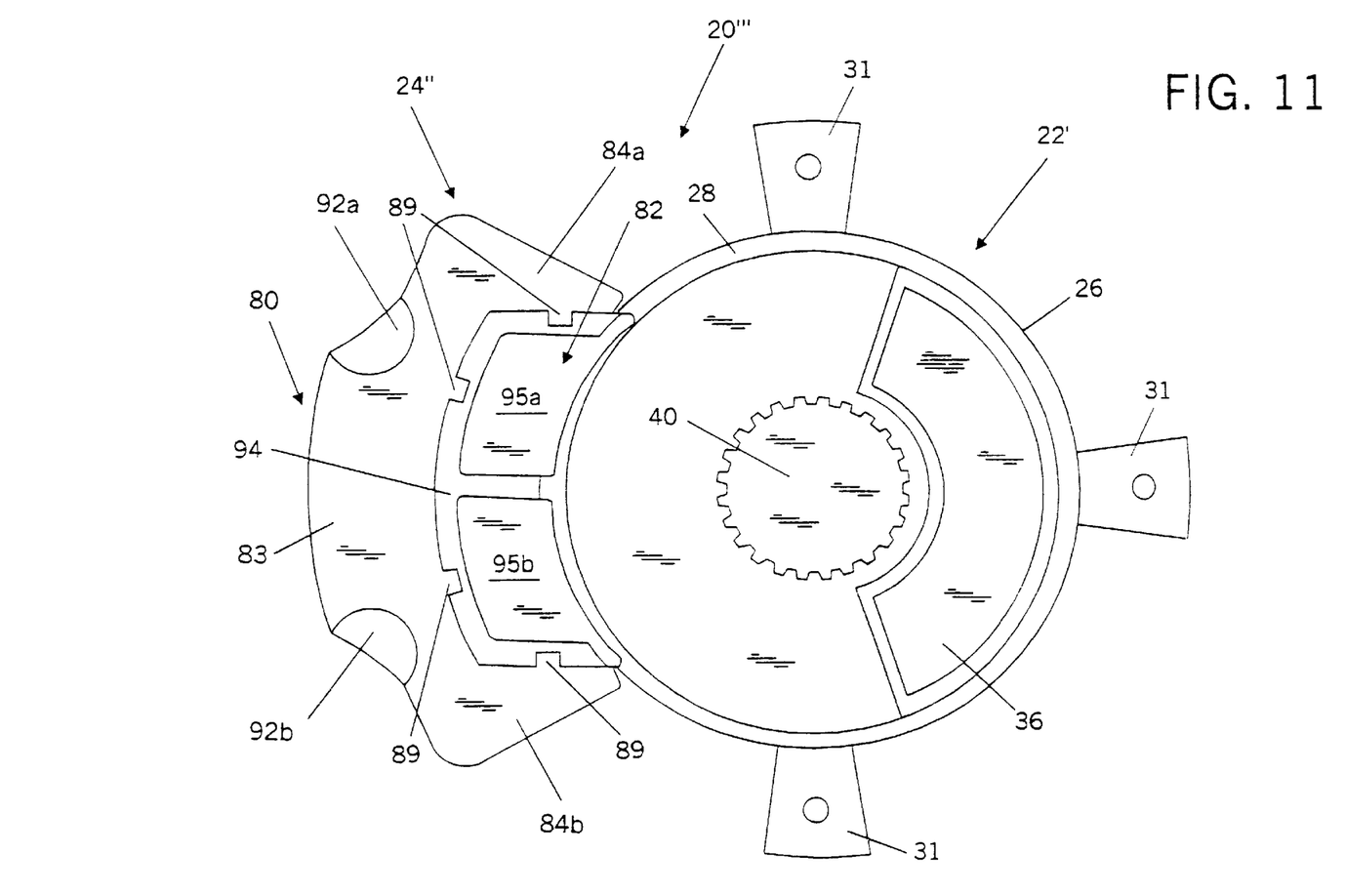
FIG. 11 is a top view of the fourth embodiment joint including the second coupling member of FIGS. 9 and 10 and the first coupling member of FIG. 6.

A fourth embodiment joint 20''' of the present invention is illustrated in FIGS. 9–11. Specifically, the second coupling member 24'' of fourth embodiment joint of the present invention is illustrated in FIGS. 9 and 10. The second coupling member 24'' is adapted to be used with first coupling member 22 or 22' both previously described. The coupling member 22' is shown combined with coupling member 24'' in FIG. 11.

As shown in FIG. 9, the second coupling member 24'' is comprised of holder 80 that supports magnet 82. The holder is slidably located in recess 65 of member 14. The unitary holder comprises a body 83 with a pair of guides 84a and 84b at the body ends. The outwardly located guide surfaces 85a and 85b follow recess walls 86a and 86b shown in FIG. 7 when the member 24'' is moved toward and away from member 22 in directions of arrow 105. The guides and body define a magnet opening 90. Recess 88 is formed in body 83 and guides 84a and 84b. Tabs 89 are placed along the recess and are adapted to be mated with voids 91 provided in magnet member 82 when the members 80 and 82 are coupled. Gripping recesses 92a and 92b are provided in body 83 and provide a means for gripping the holder 80 when it is necessary to move the coupling member 24''.

The magnet includes plastic base 94 with conventional magnet members 95a and 95b supported by the base. The base is slid into engagement with the holder and located in opening 90. The base and holder are releasable connected as the tabs are inserted in the voids 91. Members 12 and 14 are coupled using first and second coupling members 22 and 24'' in the same manner as previously described in conjunction with the second embodiment joint 20' except magnets 95a and 95b are located proximate housing 26 and do not enclose the housing 26 in the manner previously described for magnet 24'.

Figure 12:
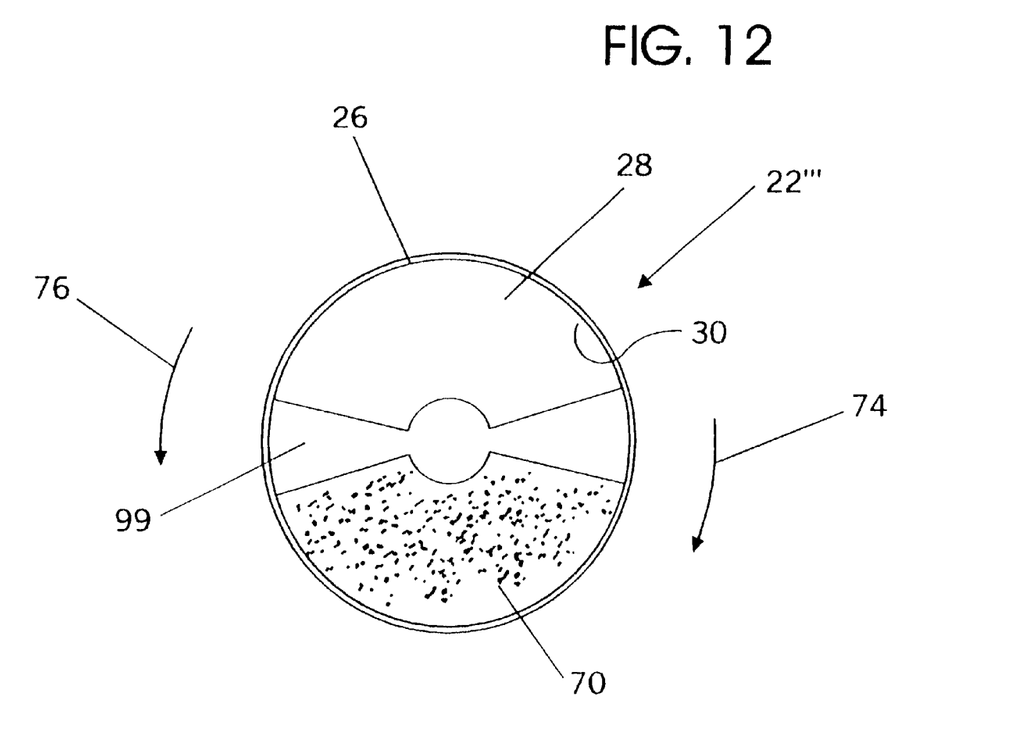
FIG. 12 is a top plan view of the first coupling member of a fifth embodiment joint of the present invention.
Figure 13:
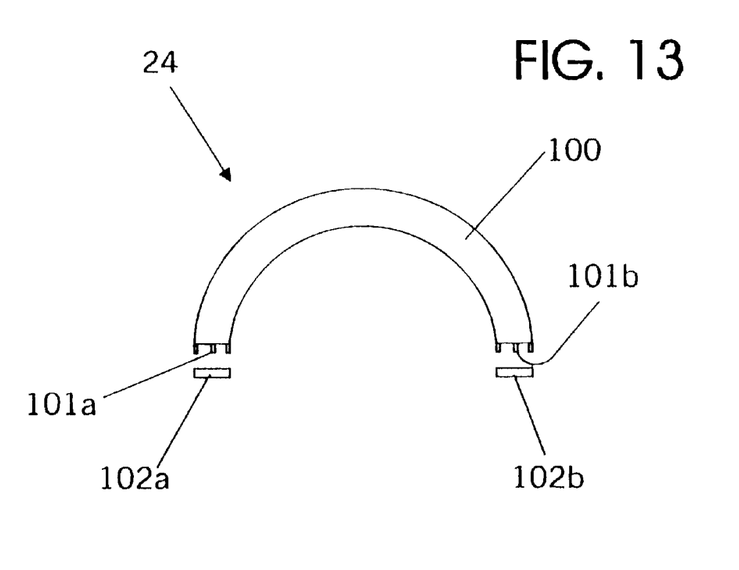
FIG. 13 is front view of the second coupling member of the fifth embodiment joint of the present invention.

A first coupling member 22''' of a fifth embodiment joint is disclosed in FIGS. 12 and 13. As shown in FIG. 11, the first coupling member 22''' comprises housing 26, plate 28, and field responsive material 70 located in a portion of chamber 30, as previously described. Air is located in the portion of chamber 30 not occupied by material 70 or transfer member 99. A transfer member 99 having a bow tie configuration is located in chamber 30. The height of the transfer member is the same as the height of the housing wall. The transfer member fits between the housing and plate snugly so that it is just free to rotate in directions 74 and 76. The transfer member is preferably made from a low carbon steel however member 99 may also be made from plastic.

A second coupling member 24''' of the fifth embodiment joint is illustrated in FIG. 13. The coupling member 24''' is adapted to be coupled with member 22''' to provide the fifth embodiment joint. The member 24''' comprises a U-shaped holder 100 with cylindrical recesses 101a and 101b at the member ends. Cylindrical magnet members 102a and 102b are inserted in the recesses. When it is necessary to join two members, the ends of the member 24''' are located proximate the ends of the bow-tie transfer member 99 to produce the requisite magnetic field and thereby alter the rheology of the material 70. Alternatively the magnet may be located proximate the material 70 and not proximate the ends of transfer member 99. The second coupling member may be connected to one member and the first coupling member may be attached to a second member. The members are uncoupled by moving the material away from the second coupling means when the second coupling means is located proximate the material. The joint is broken by removing the second coupling member when the magnets are located proximate the transfer member ends.

While we have illustrated and described preferred embodiments of the invention, it is understood that this is capable of modification, and we therefore do not wish to be limited to the precise details set forth but desire to avail ourselves of such changes and alterations as fall within the purview of the following claims.

What is claimed is:

1. A combination comprising:
   a) a first member;
   b) a second member; and
   c) a joint member for removably coupling the first and second members, said joint member comprising a first coupling member comprising a volume of field responsive material and a second coupling member comprising a field generating member for selectively applying a field across the field responsive material, the joint member also comprising means for selectively moving the field responsive material away from the field generating means to effect the rheology of the material and decouple the first and second members.

2. The combination as claimed in claim 1 wherein the second coupling member is a magnet.

3. The combination as claimed in claim 1 wherein the second coupling member is a magnet with an arcuate configuration.

4. The combination as claimed in claim 1 wherein the first coupling member comprises a housing; a cover seated on the housing, the housing and cover defining a chamber, said volume of field responsive material located in the chamber; and a transfer member for moving the material through the chamber.

5. The combination as claimed in claim 4 wherein the first coupling member further comprises a handle connected to the transfer member.

6. The combination as claimed in claim 5 wherein the first member includes a slot, the handle further comprising a tail portion adapted to be located in the slot.

7. The combination as claimed in claim 4 wherein the first coupling member further comprises a knob connected to the transfer member.

8. The combination as claimed in claim 6 wherein the slot is arcuate.

9. The combination as claimed in claim 1 wherein the first coupling member comprises a housing, a cover seated on the housing, the housing and cover defining a chamber, said volume of field responsive material located in the chamber, and a transfer member for moving the material through the chamber; and said second coupling member comprises a magnet member having a first magnet end located on the first coupling member and a second magnet end located on the second member.

10. The combination as claimed in claim 9 wherein the second member comprises a metallic member seated on the second member, and said first coupling member includes an indicia on the cover, said first magnet end being located on the indicia and said second magnet end being located on the metallic member.

11. The combination as claimed in claim 1 wherein the field responsive material is magnetorheological fluid.

12. The combination as claimed in claim 1 wherein the first member and second member are coplanar when they are coupled by the joint member.

13. The combination as claimed in claim 1 wherein the first member and second member are separated by an angle of approximately ninety degrees when they are coupled by the joint member.

14. The combination as claimed in claim 9 wherein the cover includes a draining and filling port.

15. The combination as claimed in claim 1 wherein the second coupling member comprises a holder and a magnet coupled with the holder.

16. The combination as claimed in claim 1 wherein magnet comprises a magnet holder with at least one magnet in the magnet holder.

17. The combination as claimed in claim 16 wherein the magnet holder is U-shaped with a pair of ends, a magnet being located at each end.

18. The combination as claimed in claim 1 wherein the means for selectively moving the field responsive material is comprised of a transfer member having a bow tie configuration.

19. The combination as claimed in claim 1 wherein the second coupling member comprises a slotted pole piece.

20. A joint member for selectively coupling first and second discrete members, said joint member comprising a first coupling member comprising a volume of field responsive material and a second coupling member comprising a field generating member for selectively applying a field across the field responsive material, the joint member also comprising means for selectively moving the field responsive material away from the field generating means to uncouple the discrete members.

21. The joint as claimed in claim 20 wherein the second coupling member is a magnet.

22. The joint as claimed in claim 20 wherein the second coupling member is a magnet with an arcuate configuration.

23. The joint as claimed in claim 20 wherein the first coupling member comprises a housing; a cover seated on the housing, the housing and cover defining a chamber, said volume of field responsive material located in the chamber; and a transfer member for moving the material through the chamber.

24. The joint as claimed in claim 23 wherein the first coupling member further comprises a handle connected to the transfer member.

25. The joint as claimed in claim 24 wherein the first member includes a slot, the handle further comprising a tail portion adapted to be located in the slot.

26. The joint as claimed in claim 23 wherein the first coupling member further comprises a knob connected to the transfer member.

27. The joint as claimed in claim 25 wherein the slot is arcuate.

28. The joint as claimed in claim 20 wherein the first coupling member comprises a housing, a cover seated on the housing, the housing and cover defining a chamber, said volume of field responsive material located in the chamber, and a transfer member for moving the material through the chamber; and said second coupling member comprises a magnet member having a first magnet end located on the first coupling member and a second magnet end located on the second member.

29. The joint as claimed in claim 28 wherein the second member comprises a metallic member seated on the second member, and said first coupling member includes an indicia on the cover, said first magnet end being located on the indicia and said second magnet end being located on the metallic member.

30. The joint as claimed in claim 20 wherein the field responsive material is magnetorheological fluid.

31. The joint as claimed in claim 28 wherein the cover includes a draining and filling port.

32. The joint as claimed in claim 20 wherein the second coupling member comprises a holder and a magnet coupled with the holder.

33. The joint as claimed in claim 20 wherein magnet comprises a magnet holder with at least one magnet in the magnet holder.

34. The joint as claimed in claim 33 wherein the magnet holder is U-shaped with a pair of ends, a magnet being located at each end.

35. The joint as claimed in claim 20 wherein the means for selectively moving the field responsive material is comprised of a transfer member having a bow tie configuration.

36. The joint as claimed in claim 20 wherein the second coupling member comprises a slotted pole piece.

37. The joint as claimed in claim 20 wherein the rheology of the field responsive material is altered when the field responsive material and field generating means are proximate each other.

* * * * *